United States Patent
Hosoi et al.

(10) Patent No.: US 7,467,592 B2
(45) Date of Patent: Dec. 23, 2008

(54) SEWING MACHINE

(75) Inventors: Koichi Hosoi, Inazawa (JP); Eiichi Hamajima, Kasugai (JP); Masaru Jimbo, Kasugai (JP); Ryoji Owaki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 132 days.

(21) Appl. No.: 11/402,870

(22) Filed: Apr. 13, 2006

(65) Prior Publication Data

US 2006/0290315 A1 Dec. 28, 2006

(30) Foreign Application Priority Data

Apr. 13, 2005 (JP) ............................. 2005-115488

(51) Int. Cl.
*D05B 3/00* (2006.01)

(52) U.S. Cl. .................... 112/68; 112/275; 318/685; 318/66

(58) Field of Classification Search ................. 318/66, 318/685; 112/68, 275
See application file for complete search history.

(56) References Cited

U.S. PATENT DOCUMENTS

| 5,718,183 | A  | * | 2/1998 | Shimizu et al. | ............. | 112/275 |
| 6,164,224 | A  | * | 12/2000 | Tachikawa et al. | ............ | 112/68 |
| 6,729,253 | B2 | * | 5/2004 | Mamiya et al. | ........ | 112/470.05 |

FOREIGN PATENT DOCUMENTS

JP  A-11-164976  6/1999

* cited by examiner

*Primary Examiner*—Walter Benson
*Assistant Examiner*—Antony M Paul
(74) *Attorney, Agent, or Firm*—Oliff & Berridge, PLC

(57) ABSTRACT

A feed dog drive motor and an X-direction motor are connected to common input/output ports of a CPU via first and second driver IC circuits, respectively. In response to a drive switching signal generated from the CPU, selected one of the first and second driver IC circuits is enabled, causing the feed dog drive motor and the X-directional motor to selectively energize. A common driver IC circuit can be used in place of the first and second driver IC circuits. With such a configuration, the number of input/output ports of the CPU as well as the number of driver IC circuits can be reduced.

17 Claims, 8 Drawing Sheets

FIG.6

| DRIVER SWITCHING SIGNAL | OUTPUT CURRENT SWITCHING SIGNAL | OUTPUT VOLTAGE (V) | F MOTOR DRIVE CURRENT (A) |
|---|---|---|---|
| LOW | LOW (0 V; AT REST) | 1.72 | 0.40 |
| | HIGH (3.3 V; DRIVING) | 3.42 | 0.80 |
| | HIGHim (INITIALIZATION) | 2.91 | 0.65 |

FIG.7

| DRIVER SWITCHING SIGNAL | OUTPUT CURRENT SWITCHING SIGNAL | OUTPUT VOLTAGE (V) | X MOTOR DRIVE CURRENT (A) |
|---|---|---|---|
| HIGH | LOW (0 V; AT REST) | 0.88 | 0.21 |
| | HIGH (3.3 V; DRIVING) | 3.10 | 0.70 |
| | HIGHim (INITIALIZATION) | 2.40 | 0.56 |

FIG.11

| SOLENOID | SOLENOID SWITCHING SIGNAL | DUTY RATIO (%) |
| --- | --- | --- |
| THREAD ADJUSTMENT SOLENOID | LOW | 25 |
| MOVABLE BLADE SOLENOID | HIGH | 50 |

SEWING MACHINE

CROSS REFERENCE TO RELATED APPLICATIONS

This application claims priorities to Japanese Patent Application Nos. 2005-115488 filed on Apr. 13, 2005, the contents of which are hereby incorporated by reference into the present application.

TECHNICAL FIELD

The present invention relates to a sewing machine comprising first and second driving mechanisms for driving a workpiece during a sewing operation, and first and second electric actuators for driving the first and second driving mechanisms with different drive currents. The present invention particularly relates to a sewing machine with a reduced number of driver circuits for driving the electric actuators and a reduced number of input/output ports in a CPU of the sewing machine.

BACKGROUND

Various sewing machines capable of sewing desired embroidery patterns on a workpiece set in an embroidery frame by mounting an embroidery device in an electronic sewing machine capable of sewing utility patterns such as zigzag stitches and triple stitches, and common patterns including various ornamental patterns have been commercialized and proposed. Recent electronic sewing machines are being provided with a workpiece feeding distance modifying motor for modifying the tilt of a feeding regulator in a feed dog driving mechanism fox driving the feed dog to move a workpiece; a needle swing motor for driving a needle swinging mechanism to pivot a needle bar; a frame moving motor built into the embroidery device for driving the embroidery frame in two directions orthogonal to one another (X- and Y-directions); and the like.

For example, a sewing machine described in Japanese unexamined patent application publication No. HEI-11-164976 includes a needle bar driving mechanism for driving the needle bar vertically; a needle bar swinging mechanism for swinging the needle bar; a thread take-up driving mechanism for driving the thread take-up; a forward/rearward feed dog driving mechanism for driving the feed dog forward and rearward; and the like. The sewing machine also includes a stepping motor for driving the needle bar swinging mechanism; a stepping motor for driving the forward/rearward feed dog moving mechanism; a stepping motor for driving a left/right driving mechanism provided in the embroidery device; and a stepping motor for driving a forward/rearward driving mechanism.

In order to drive the stepping motors with this construction, a driver circuit for each stepping motor is necessary for supplying a drive current to an excitation coil. Further, a plurality of input/output ports and the like are required in a control device for supplying an excitation signal comprising a step pulse to each driver circuit.

A sewing machine capable of sewing embroidery patterns according to Japanese unexamined patent application publication No. HEI-11-164976 described above is provided with stepping motors for swinging the needle bar and for driving the feed dog, and the embroidery device is provided with stepping motors for moving the embroidery frame left and right and forward and rearward. Hence, not only are a plurality of driver circuits required for driving each of the stepping motors, but the CPU in the controller requires 4-8 input/output ports for these stepping motors according to the number of excitation phases.

Recent computerized sewing machines equipped with numerous functions include not only the stepping motors described above, but also numerous stepping motors for an automatic thread guard mechanism, automatic thread adjusting mechanism, electronic thread cutting mechanism, automatic threading mechanism, thread winding mechanism, and the like. As the number of stepping motors increases, not only does the number of driver circuits increase, but also does the number of input/output ports required in the CPU for connecting the CPU to these driver circuits.

A CPU having a large number of input/output ports is generally more expensive than a CPU with few ports, leading to an increase in the cost of the sewing machine. Further, since a CPU with a large number of input/output ports is generally larger in size, the circuit board on which this large CPU is mounted is also larger in size, leading to an increased size of the sewing machine.

Further, since the operating properties of these driving mechanisms differ according to each use, the magnitude of the torque for driving the driving mechanisms also differs. As a result, since the drive currents supplied to the stepping motors for driving the driving mechanisms differ, a universal driver circuit cannot be used to drive all the stepping motors.

While it is conceivable to connect an ASIC (Application Specific Integrated Circuit), and particularly gate array IC chips, to the input/output ports of the CPU to reduce the number of required I/O ports, these gate array IC chips are configured of LSI chips manufactured individually according to specification and are therefore more expensive.

SUMMARY

In view of the foregoing, to use a CPU with a reduced number of input/output ports, a sewing machine according to one aspect of the invention includes first and second driving mechanisms, first and second electric actuators, a CPU, first and second driver circuits, a switching unit, and a voltage regulating circuit. The first driving mechanism moves a workpiece during a first sewing operation. The second driving mechanism moves a workpiece during a second sewing operation. Either the first or the second driving mechanism is selectively driven. The first electric actuator drives the first drive mechanism with a first drive current, and the second electric actuator drives the second drive mechanism with a second drive current different from the first drive current. The CPU controls the first and second electric actuators and has input/output ports including common input/output ports. The first driver circuit is connected between the common input/output ports of the CPU and the first electric actuator, and the second driver circuit is connected between the common input/output ports of the CPU and the second electric actuator. The switching unit performs a switching action to selectively activate either one of the first and second electric actuators. The voltage regulating circuit is connected between one of the input/output ports of the CPU and the first driver circuit and between the one of the input/output ports of the CPU and the second driver circuit for applying a voltage corresponding to the first drive current to the first driver circuit and applying a voltage corresponding to the second drive current to the second driver circuit in synchronization with the switching action of the operation switching unit.

With the above-described configuration, even though the first and second electric actuators are connected to the common input/output ports of the CPU, the switching unit selectively switches operations of the first and second electric actuators. Moreover, the voltage regulating unit applies a voltage corresponding to the first or second drive current to the corresponding driver circuit in synchronization with the switching unit.

Accordingly, even when the drive currents of the first and second electric actuators are different due to a different magnitude of torque required for driving the first and second driving mechanisms or when the first and second electric actuators are connected to the common input/output ports of the CPU, the sewing machine can drive the first electric actuator with an appropriate drive current for this actuator and can drive the second electric actuator with a drive current appropriate for that actuator.

According to another aspect of the invention, to further attain reduction of the number of driving circuits, there is provided a sewing machine that includes first and second drive mechanisms, first and second electric actuators, a CPU, a common driver circuit, a switching unit, and a control pulse signal generator. The first driving mechanism moves a workpiece during a first sewing operation, and the second driving mechanism moves a workpiece during a second sewing operation. Either the first or the second driving mechanism is selectively driven. The first electric actuator drives the first drive mechanism with a first drive current, and the second electric actuator drives the second drive mechanism with a second drive current different from the first drive current. The CPU controls the first and second electric actuators and has input/output ports including common input/output ports. The common driver circuit is connected between the common input/output ports of the CPU and the first and second electric actuators. The switching unit performs a switching action to selectively activate either one of the first and second electric actuators. The control pulse signal generator adjusts a duty ratio of a control signal supplied to the common driver circuit so that the common driver circuit outputs a drive current for the respective first and second electric actuators in response to the switching unit.

With the above-described configuration, the switching unit can selectively switch activation between the first or second electric actuators, even when the first and second electric actuators are connected to the common input/output ports of the CPU via the common driver circuit. Moreover, the control pulse signal generator supplies a control pulse with an adjusted duty ratio to the driver circuit in response to the switching unit that switches activation between the first and second electric actuators in order that the driver circuit supplies a drive current appropriate to the respective first or second electric actuator.

Accordingly, even when the drive currents of the first and second electric actuators are different due to a different magnitude of torque required for driving the first and second driving mechanisms or when the first and second electric actuators are connected to the common input/output ports of the CPU via the common driver circuit, the sewing machine can drive the first electric actuator with an appropriate drive current for this actuator an can drive the second electric actuator with a drive current appropriate for that actuator.

BRIEF DESCRIPTION OF THE DRAWINGS

The particular features and advantages of the invention as well as other objects will become apparent from the following description taken in connection with the accompanying drawings, in which:

FIG. 6 is a table showing voltage and current values for the voltage adjusting circuit in the case of a LOW level driver switching signal;

FIG. 7 is a table showing voltage and current values for the voltage adjusting circuit in the case of a HIGH level driver switching signal;

FIG. 11 is a table showing the switching signal and duty ratio set for the different solenoids.

DETAILED DESCRIPTION

A sewing machine according to an embodiment of the present invention is equipped with a feed dog drive motor and an X-direction motor for driving a forward/rearward feed dog moving mechanism and an X-direction driving mechanism of an embroidery frame moving mechanism, which are not operated simultaneously. In this case, the feed dog drive motor and X-direction motor are connected to common input/output ports of the CPU and are driven by individual driver circuits.

Figure 1:
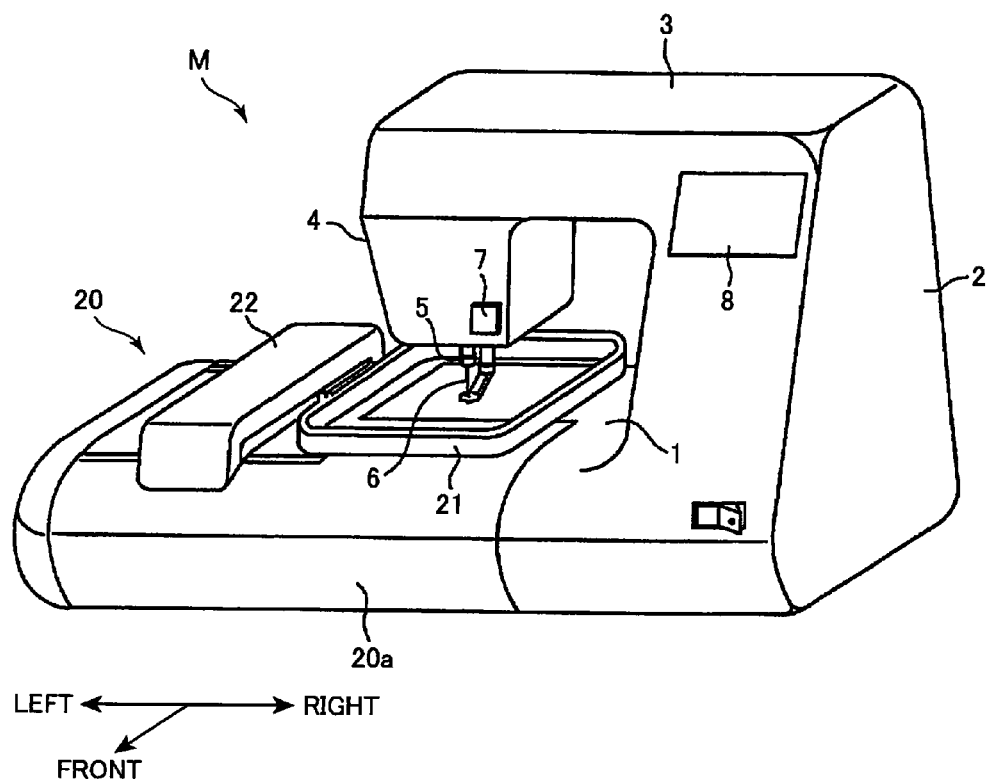
FIG. 1 is a perspective view of a computerized sewing machine according to a preferred embodiment of the present invention.

FIG. 1 shows a computerized sewing machine M according to the preferred embodiment. An embroidery frame moving mechanism 20 described later is mounted on the sewing machine M for sewing embroidery patterns. As shown in FIG. 1, the sewing machine M includes a sewing bed 1, an arm support 2 erected from the right end of the sewing bed 1, and an arm 3 that extends leftward in FIG. 1 from the top end of the arm support 2 so as to confront the sewing bed 1.

The sewing bed 1 is provided with a vertical feed dog moving mechanism (not shown) for moving a feed dog up and down; a forward/rearward feed dog moving mechanism (not shown) for moving the feed dog forward and rearward; a thread loop catcher, such as a horizontal bobbin, accommodating a bobbin and working in cooperation with a stitching needle 6; and the like.

The arm 3 includes a needle bar driving mechanism (not shown) for moving a needle bar 5 vertically, the needle bar 5 having the stitching needle 6 mounted in the bottom end thereof; a needle bar pivoting mechanism (not shown) for pivoting the needle bar 5 in a direction orthogonal to the direction in which a workpiece is fed; a thread take-up driving mechanism (not shown) for driving a thread take-up (not shown) vertically in sync with the vertical movement of the needle bar 5; and the like.

Figure 2:
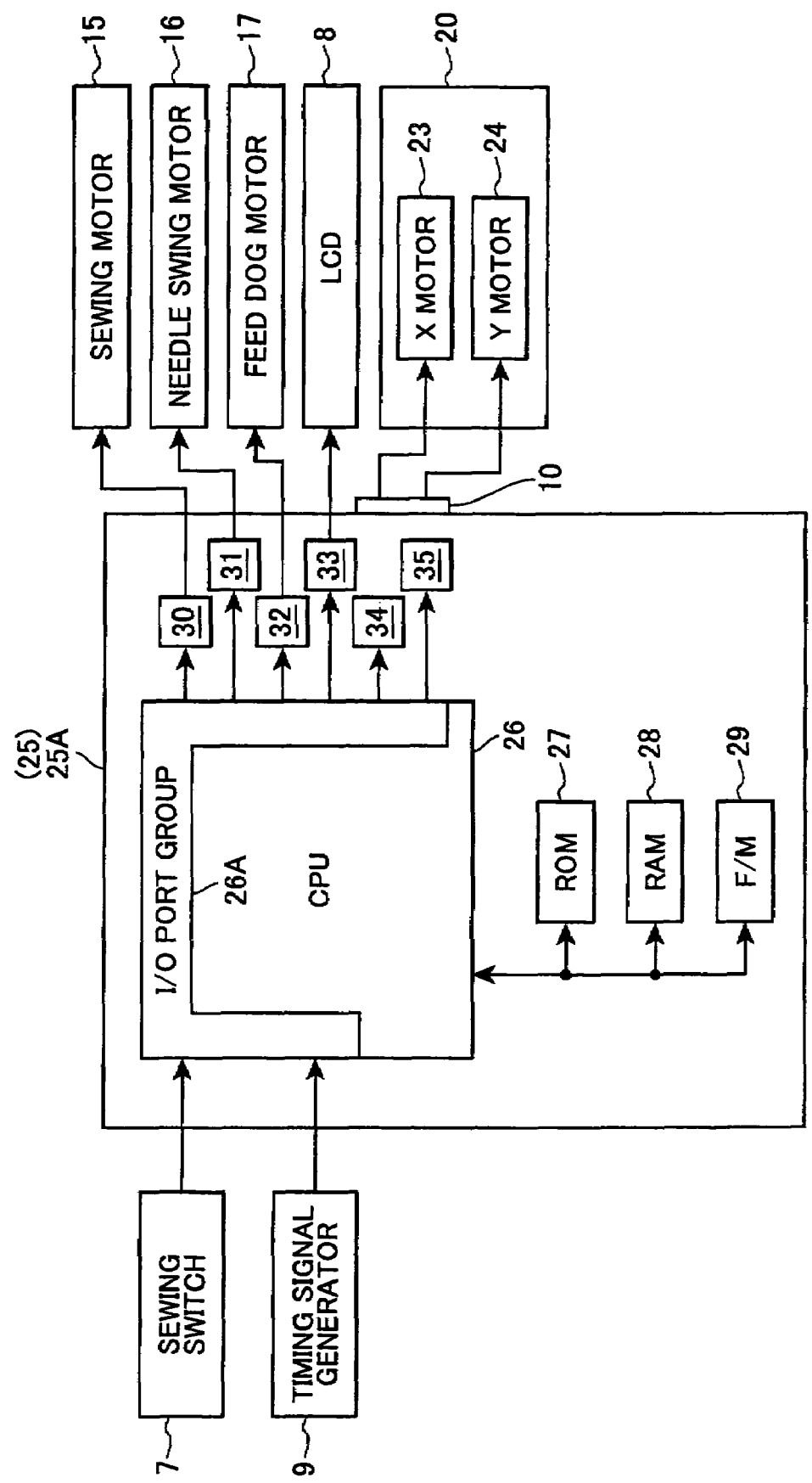
FIG. 2 is a block diagram showing a control system employed in the computerized sewing machine.

As shown in FIG. 2, a sewing motor 15 drives the vertical feed dog moving mechanism, the needle bar driving mechanism, and the thread take-up driving mechanism. A needle swing motor 16 drives the needle bar pivoting mechanism. A feed dog drive motor 17 drives the forward/rearward feed dog moving mechanism. The needle swing motor 16 and the feed dog drive motor 17 are each configured of a stepping motor.

As shown in FIG. 1, the arm 3 includes a head portion 4 on the end farthest from the arm support 2. A sewing switch 7 for manually starting and stopping sewing operations is provided on the head portion 4. A color liquid crystal display (hereinafter simply referred to as "display") 8 is provided on the front surface of the arm 3. The display 8 functions to display various stitching patterns, including utility patterns and embroidery patterns, pattern names, various function names, various messages, and the like.

Touch keys (not shown) formed of transparent electrodes are disposed substantially on the front surface of the display 8. By pressing desired touch keys, the user can select a desired pattern to be sewed or indicate a function. A detailed description of these patterns and functions is not included herein.

A free head portion, commonly called a free arm, is formed on the left end of the sewing bed 1 in FIG. 1. The embroidery frame moving mechanism 20 (also referred to as an embroidery device) is detachably mounted on this free head portion.

The embroidery frame moving mechanism 20 includes a main case 20a, an embroidery frame 21 in which a cloth workpiece is detachably mounted, a Y-direction drive unit 22 having a built-in Y-direction driving mechanism for moving the embroidery frame 21 in a Y-direction (front-to-rear direction), and an X-direction driving mechanism (not shown) accommodated in the main case 20a for driving the Y-direction drive unit 22 in the X-direction (left-to-right direction). The embroidery frame moving mechanism 20 also includes an X-direction motor 23 (see FIG. 2) for driving the X-direction driving mechanism, and a Y-direction motor 24 (see FIG. 2) for driving the Y-direction driving mechanism. In the preferred embodiment, the X-direction motor 23 and Y-direction motor 24 axe configured of stepping motors.

When the embroidery frame moving mechanism 20 is mounted on the free head portion, the X-direction motor 23 and Y-direction motor 24 are electrically connected to a controller 25 (see FIG. 2) fox the sewing machine M via a connector 10. The controller 25 controls the driving of the X-direction motor 23 and Y-direction motor 24 so that the embroidery frame 21 in which the workpiece is set can be moved independently in the X- and Y-directions, while sewing an embroidery pattern.

Next, a control system of the sewing machine M will be described with reference to FIG. 2. As shown in FIG. 2, the controller 25 includes a circuit board 25A on which are provided a computer that includes a CPU 26 having a plurality of input/output ports (I/O port group 26A), a ROM 27, a RAM 28, and a nonvolatile flash memory 29 that can be electrically rewritten; a plurality of driver circuits 30-35; and the like. The sewing switch 7 described above, a timing signal generator 9 for detecting the rotational phase of a main sewing shaft, and the like are connected to the I/O port group 26A.

The driver circuits 30-35 are also connected to the I/O port group 26A. These driver circuits 30-35 are also individually connected to the motors 15-17 described above, the display 8, and the X-direction and Y-direction motors 23 and 24 of the embroidery frame moving mechanism 20 via the connector 10.

In addition to common control programs for controlling the sewing of common stitches including utility patterns, and for controlling the display, the ROM 27 stores an editing program for editing a selected embroidery pattern displayed on the display 8 through such processes as enlargement, reduction, and rotation; a sewing control program for sewing a selected embroidery pattern; and the like.

The RAM 28 is provided with various memory areas required for performing the various control processes described above, such as memory areas for flags, pointers, counters, and the like, as well as registers and buffers.

Next, a description will be given of the driver circuit 32 and driver circuit 34 connected to the I/O port group 26A of the CPU 26, and the feed dog drive motor 17 (hereinafter called the "F motor") and the X-direction motor 23 (hereinafter called the "X motor") connected to the driver circuit 32 and driver circuit 34 respectively, and a voltage regulating circuit 40. The voltage regulating circuit 40 applies a voltage to the driver circuit 32 and driver circuit 34 corresponding to the excitation drive current suited to the motors 17 and 23, respectively. The voltage is applied at the same time activation of the F motor 17 and X motor 23 is switched.

Figure 3:
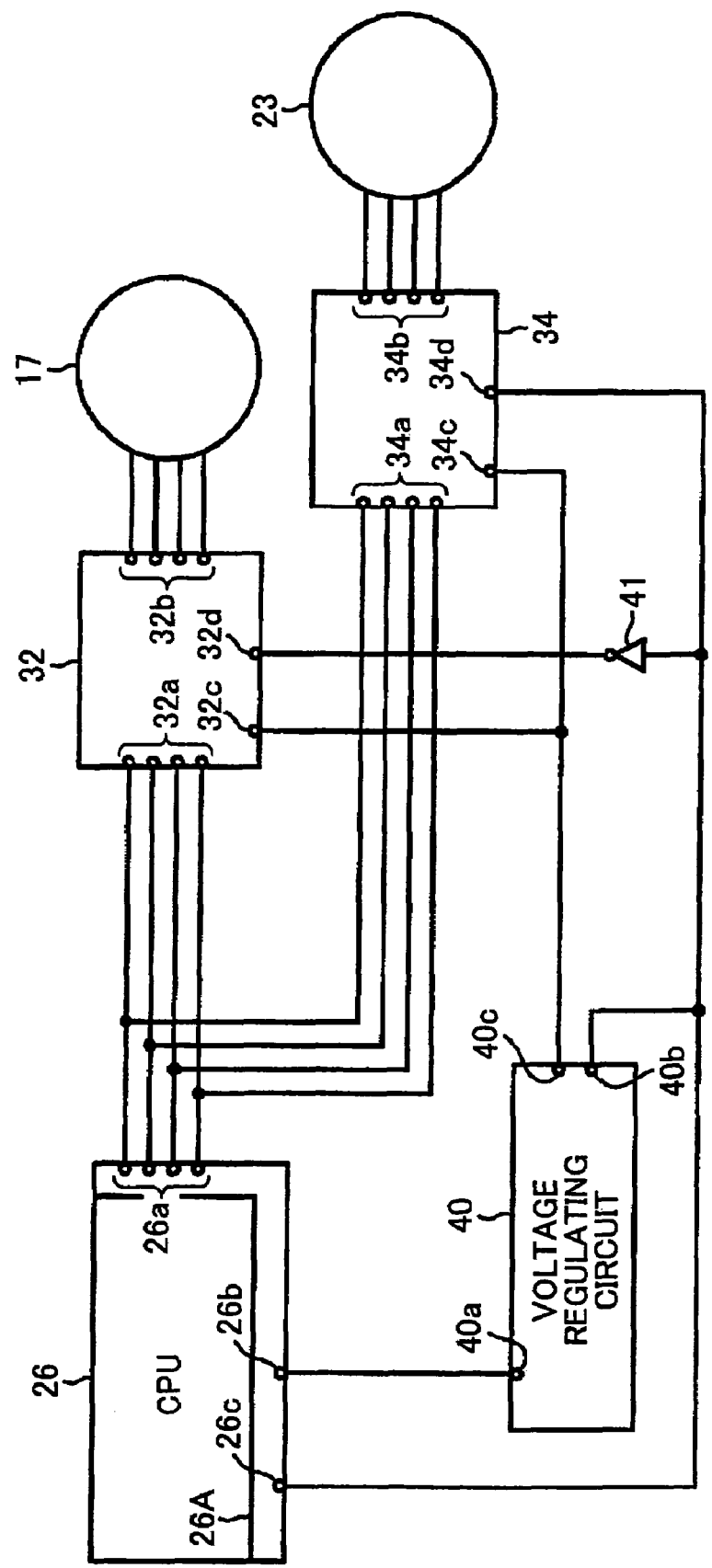
FIG. 3 is an explanatory diagram illustrating the relationship of a CPU, driver circuits, a voltage regulating circuit, and drive motors.

As shown in FIG. 3, the I/O port group 26A of the CPU 26 includes four common excitation phase output ports 26a for outputting excitation phase signals used for two-phase or four-phase excitation of excitation coils in the F motor 17 and X motor 23; an output current switching port 26b for outputting a three-state signal, causing the voltage regulating circuit 40 to output a voltage corresponding to the excitation drive current applied to the F motor 17 and X motor 23; and a driver switching port 26c for outputting a driver switching signal to selectively switch activation of the driver circuit 32 and driver circuit 34.

The driver circuit 32 includes four excitation signal input terminals 32a for receiving excitation signals from the CPU 26; four excitation current output terminals 32b connected to an excitation coil (not shown) in the F motor 17; an output current switching terminal 32c for receiving an output current switching voltage from the voltage regulating circuit 40; and a switching terminal 32d for receiving an inputted driver switching signal.

The driver circuit 34 includes four excitation signal input terminals 34a for receiving inputted excitation signals from the CPU 26; four excitation current output terminals 34b for outputting an excitation drive current to an excitation coil (not shown) in the X motor 23; an output current switching terminal 34c for receiving an output current switching voltage from the voltage regulating circuit 40; and a switching terminal 34d for receiving an inputted driver switching signal.

The voltage regulating circuit 40 includes a first input terminal 40a connected to the output current switching port 26b for receiving a three-state signal therefrom; a second input terminal 40b connected to the driver switching port 26c and the switching terminal 34d; and an output terminal 40c for outputting an output current switching voltage to the output current switching terminals 32c and 34c.

As shown in FIG. 3, the four excitation phase output ports 26a provided in the I/O port group 26A are connected both to the four excitation signal input terminals 32a provided on the driver circuit 32, and the four excitation signal input terminals 34a provided on the driver circuit 34. In other words, the driver circuit 32 and driver circuit 34 share connections to the excitation phase output ports 26a of the CPU 26.

When the excitation signal input terminals 32a receive an excitation phase signal from the CPU 26, the driver circuit 32 outputs an excitation drive current via the excitation current output terminals 32b to the F motor 17. The outputted excitation drive current corresponds to an output current switching voltage that the voltage regulating circuit 40 has applied to an output current switching terminal 32c of the driver circuit

32. However, the driver circuit 32 operates only when a HIGH level driver switching signal is supplied to the switching terminal 32d.

Similarly, when the excitation signal input terminals 34a of the driver circuit 34 receives an excitation phase signal from the CPU 26, the excitation current output terminals 34b output an excitation drive current to the X motor 23 corresponding to an output current switching voltage that the voltage regulating circuit 40 has applied to the output current switching terminal 34c. However, the driver circuit 34 only operates when a HIGH level driver switching signal is supplied to the switching terminal 34d.

When the driver switching port 26c of the CPU 26 outputs a HIGH level driver switching signal, this signal is supplied directly to the switching terminal 34d of the driver circuit 34 so that the driver circuit 34 is activated. However, the HIGH level driver switching signal passes through an inverter 41 before being supplied to the switching terminal 32d. The inverter 41 inverts the HIGH level signal to a LOW level signal. Accordingly, the driver circuit 32 is not activated.

Here, an operation switching mechanism is configured of the driver switching port 26c, the inverter 41, and the like. However, when the driver switching port 26c of the CPU 26 outputs a LOW level driver switching signal, the driver circuit 32 operates, but the driver circuit 34 does not operate. In this way, the driver switching signal is used to selectively switch which of the driver circuit 32 and driver circuit 34 operates.

Figure 4:
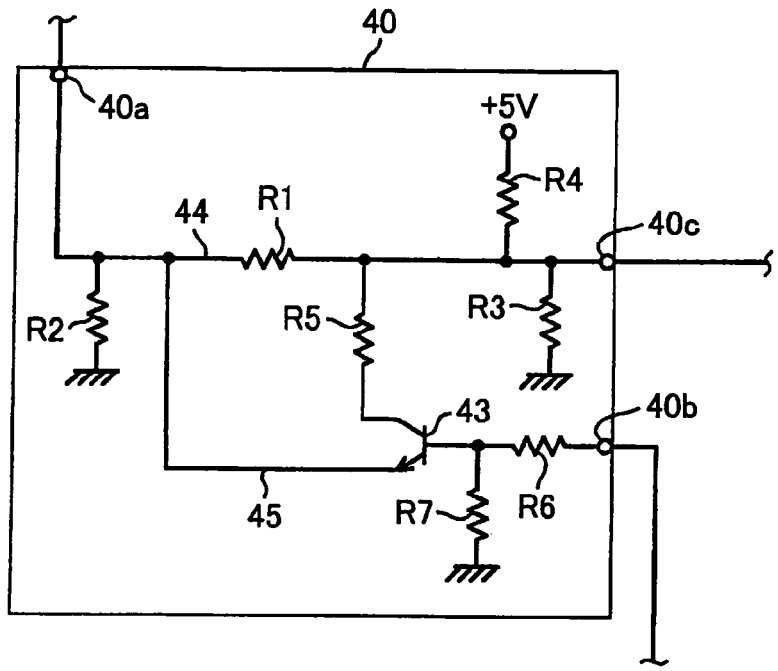
FIG. 4 is a circuit diagram of the voltage regulating circuit.

Next, the voltage regulating circuit 40 will be described in greater detail. As shown in FIG. 4, the voltage regulating circuit 40 is configured of a voltage divider circuit having a plurality of resistors R1-R7, and an NPN transistor 43. The first input terminal 40a and output terminal 40c are connected by a main wire 44. The resistor R1 is connected in series on the main wire 44. Two resistors R2 and R3 are connected on one end to the main wire 44 and grounded on the other end. A +5 V terminal is connected to the main wire 44 via a pull-up resistor R4.

The second input terminal 40b is connected to the base of the NPN transistor 43 via the resistor R6, while the collector of the NPN transistor 43 is connected to the main wire 44 via the resistor R5 and the emitter of the NPN transistor 43 is connected to the main wire 44 via a wire 45 A bias resistor R7 is also connected to the base of the NPN transistor 43. Therefore, the first input terminal 40a is connected to the output current switching port 26b of the CPU 26; the output terminal 40c is connected to the output current switching terminal 32c and output current switching terminal 34c of the driver circuit 32 and driver circuit 34, respectively; and the second input terminal 40b is connected to the driver switching port 26c of the CPU 26.

The output current switching port 26b of the CPU 26 selectively outputs three signals (referred to as a "three-state signal") to the first input terminal 40a. The three-state signal is configured of a LOW level signal, a HIGH level signal, and a high impedance signal. In addition, the driver switching port 26c outputs a LOW level driver switching signal for operating the driver circuit 32 and a HIGH level driver switching signal for operating the driver circuit 34.

As described above, the output current switching port 26b outputs the LOW level signal when the F motor 17 and X motor 23 are at rest and not being driven, preventing inadvertent rotation of the F motor 17 and X motor 23. The output current switching port 26b outputs the HIGH level signal when exciting and driving the F motor 17 and X motor 23.

The output current switching port 26b outputs a high impedance signal when performing a process to initialize the F motor 17 and X motor 23 when the power of the sewing machine M is turned on. In this initialization process, the F motor 17 and X motor 23 are driven until a positioning piece contacts the frame of the sewing machine M. However, since the F motor 17 and X motor 23 are made to step out during initialization, the motors are driven by a lower excitation current than a normal driving current to ensure a quiet initialization process.

Figure 5A:
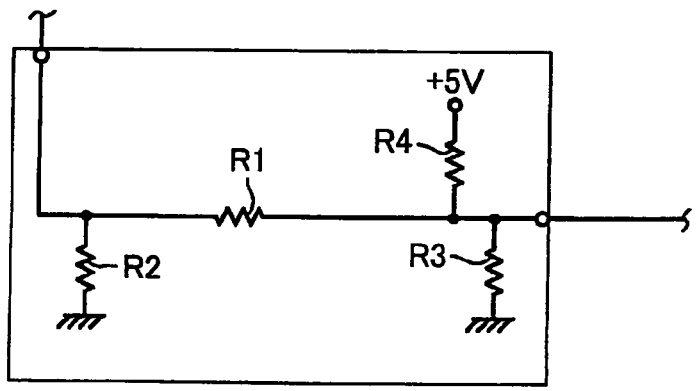
FIG. 5A is a circuit diagram of a first voltage divider circuit.

Hence, when the driver switching port 26c outputs a LOW level driver switching signal to the second input terminal 40b of the voltage regulating circuit 40, the NPN transistor 43 does not operate. An equivalent circuit of the voltage regulating circuit 40 shown in FIG. 5A is configured of a first voltage divider circuit having four resistors R1-R4.

In this equivalent circuit, the output terminal 40c of the voltage regulating circuit 40 outputs voltages of 1.72 V, 3.42 V, and 2.91 V to the output current switching terminals 32c and 34c of the driver circuits 32 and 34, respectively, when the output current switching port 26b outputs a LOW level signal (0 V), HIGH level signal (3 V), and high impedance signal, respectively, as shown in FIG. 6. Since the driver circuit 32 has been enabled based on the LOW level driver switching signal from the driver switching port 26c, the excitation current output terminals 32b outputs excitation drive currents of 0.40 A, 0.80 A, and 0.65 A to the F motor 17 in response to the above output voltages.

Figure 5B:
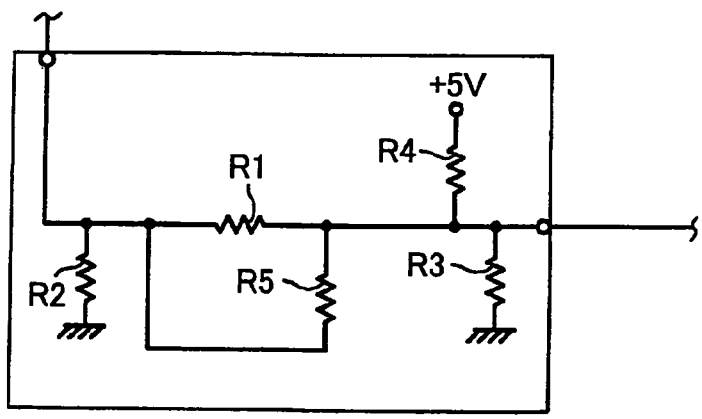
FIG. 5B is a circuit diagram of a second voltage divider circuit.

However, when the driver switching port 26c outputs the HIGH level driver switching signal to the second input terminal 40b of the voltage regulating circuit 40, the NPN transistor 43 is activated. An equivalent circuit of the voltage regulating circuit 40 shown in FIG. 5B is configured of a second voltage divider circuit having five resistors R1-R5.

In this equivalent circuit, the output terminal 40c of the voltage regulating circuit 40 outputs voltages of 0.88 V, 3.10 V, and 2.40 V to the output current switching terminals 32c and 34c of the driver circuits 32 and 34, respectively, when the output current switching port 26b outputs a LOW level signal (0 V), HIGH level signal (3 V), and high impedance signal, respectively, to the first input terminal 40a, as shown in FIG. 7. Since driver circuit 34 has been activated based on the HIGH level driver switching signal from the driver switching port 26c, the excitation current output terminals 34b outputs excitation drive currents of 0.21 A, 0.70 A, and 0.56 A to the X motor 23 in response to the above output voltages.

Hence, three voltages corresponding to three types of drive currents suitable for the F motor 17 and X motor 23 are applied to the driver circuits 32 and 34 in synchronization with the driver switching port 26c outputting a driver selection signal for switching which of the F motor 17 and X motor 23 is activated.

The resistors R1-R7 of the voltage regulating circuit 40 have been selected to output the voltages shown in FIGS. 6 and 7 based on the output current switching signals (three-state signal). However, these resistors are suitably adjusted according to the driving characteristics (drive currents) of the motors.

Next, the operations of the sewing machine M having the above construction will be described. In this description, the F motor 17 is driven for moving the feed dog forward and rearward to execute normal stitching, while the X motor 23 is driven for moving the embroidery frame when the embroidery frame moving mechanism 20 is mounted on the free head portion to sew an embroidery pattern. Hence, the F motor 17 and X motor 23 are never driven simultaneously. Moreover, the excitation drive current supplied to the F motor 17 is larger than that supplied to the X motor 23 in order to generate a large feeding torque with the feed dog and a holding torque for maintaining the position of the feed dog.

First, the case of performing common stitches when the embroidery frame moving mechanism 20 is not mounted will be described. In this case, when the power switch is turned on, the CPU 26 is initialized according to a reset signal, while a LOW level driver switching signal is outputted from the driver switching port 26c. Accordingly, a LOW level signal is supplied to the second input terminal 40b of the voltage regulating circuit 40, while the inverter 41 inverts the LOW level signal to a HIGH level driver switching signal for activating the driver circuit 32.

Since the voltage regulating circuit 40 has the equivalent circuit shown in FIG. 5A at this time, based on FIG. 6, the output current switching port 26b of the CPU 26 supplies a high impedance signal to the first input terminal 40a, and the output terminal 40c outputs a voltage of 2.91 V to the output current switching terminal 32c of the driver circuit 32 for initializing the F motor 17. Hence, the driver circuit 32 supplies an excitation drive current of 0.65 A to the F motor 17.

When initialization is completed, the CPU 26 outputs a LOW level signal to the voltage regulating circuit 40 from the output current switching port 26b. Hence, the voltage regulating circuit 40 outputs a voltage of 1.72 V to the driver circuit 32, and the driver circuit 32 supplies an excitation drive current of 0.40 A to the F motor 17.

However, since the CPU 26 outputs a HIGH level signal to the voltage regulating circuit 40 from the output current switching port 26b for driving the F motor 17, the voltage regulating circuit 40 outputs a voltage of 3.42 V to the driver circuit 32. Accordingly, the driver circuit 32 can supply an excitation drive current of 0.80 A. At this time, upon receiving an excitation phase signal from the CPU 26, the driver circuit 32 supplies an excitation drive current of 0.80 A in pulses to the F motor 17 based on the excitation phase signal.

Next, an example will be described for sewing an embroidery pattern. In this case, the CPU 26 is initialized by the reset signal when the power switch of the sewing machine M is turned on, and the driver switching port 26c outputs a HIGH level driver switching signal. Therefore, a HIGH level signal is supplied to the second input terminal 40b of the voltage regulating circuit 40, and the driver circuit 34 is activated by the HIGH level driver switching signal.

Since the voltage regulating circuit 40 has the equivalent circuit shown in FIG. 5B at this time, based on FIG. 7, the output current switching port 26b of the CPU 26 supplies a high impedance signal to the first input terminal 40a, and the output terminal 40c outputs a voltage of 2.40 V to the output current switching terminal 34c of the driver circuit 34 for initializing the X motor 23. Hence, the driver circuit 34 supplies an excitation drive current of 0.56 A to the X motor 23.

When initialization is completed, the CPU 26 outputs a LOW level signal to the voltage regulating circuit 40 from the output current switching port 26b. Hence, the voltage regulating circuit 40 outputs a voltage of 0.88 V to the driver circuit 34, and the driver circuit 34 supplies an excitation drive current of 0.21 A to the X motor 23.

However, since the CPU 26 outputs a HIGH level signal to the voltage regulating circuit 40 from the output current switching port 26b for driving the X motor 23, the voltage regulating circuit 40 outputs a voltage of 3.10 V to the driver circuit 34. Accordingly, the driver circuit 34 can supply an excitation drive current of 0.70 A. At this time, upon receiving an excitation phase signal from the CPU 26, the driver circuit 34 supplies an excitation drive current of 0.70 A in pulses to the X motor 23 based on the excitation phase signal.

In this way, the F motor 17 and X motor 23 are connected to the excitation phase output ports 26a, serving as common input/output ports of the CPU 26, via the driver circuits 32 and 34, and the voltage regulating circuit 40 is provided for selectively switching which of the F motor 17 and X motor 23 are operated. Accordingly, both the F motor 17 and the X motor 23 can be driven with an appropriate drive current, even when the drive currents for the F motor 17 and X motor 23 are different due to a difference in the magnitude of torque required for driving the forward/rearward feed dog moving mechanism and for driving the X-direction driving mechanism and when the F motor 17 and X motor 23 are connected to common excitation phase output ports 26a of the CPU 26. In addition, this construction can also minimize the number of input/output ports required in the CPU 26 and greatly reduce the cost of the CPU 26.

Further, the driver circuits 32 and 34 are connected to the F motor 17 and X motor 23, respectively, and are selectively activated based on a driver switching signal outputted from the driver switching port 26c. Hence, the construction for switching which of the driver circuits 32 and 34 is activated can be simplified.

Next, variations of the preferred embodiment will be described.

(1) While not shown in the drawings, the sewing machine M may be provided with a horizontal feed dog moving mechanism for moving the feed dog by fine degrees in the left and right direction (the direction orthogonal to the workpiece feeding direction), and a stepping motor for driving the horizontal feed dog moving mechanism. The first driving mechanism is the Y-direction driving mechanism of the embroidery frame moving mechanism 20 described above, while the second driving mechanism is the horizontal feed dog moving mechanism. The first electric actuator may be the Y-direction motor 24, and the second electric actuator the stepping motor for moving the feed dog horizontally.

In this variation, both the Y-direction motor 24 for driving the Y-direction driving mechanism of the embroidery frame moving mechanism 20 and the stepping motor for driving the horizontal feed dog moving mechanism can be driven with appropriate drive currents, even when the Y-direction motor 24 requires a larger excitation drive current than the stepping motor.

(2) While not shown in the drawings, the sewing machine M may be provided with a thread cutting mechanism for cutting thread with a fixed blade and a movable blade, and a stepping motor for driving the movable blade. Further, the sewing machine M may be provided with a thread adjusting mechanism for adjusting the sewing thread by pinching the thread between a pair of thread adjustment plates including a fixed plate and a movable plate, and a stepping motor for pressing the movable plate against the fixed plate. Here, the first driving mechanism is the thread cutting mechanism, while the second driving mechanism is the thread adjusting mechanism. Further, the first electric actuator is the stepping motor for driving the movable blade, while the second electric actuator is the stepping motor for adjusting the thread.

In this case, both the stepping motor for driving the thread cutting mechanism and the stepping motor for driving the thread adjusting mechanism can be driven at appropriate drive currents, even when the stepping motor for driving the movable blade requires a larger excitation drive current than the thread adjustment stepping motor.

Figure 8:
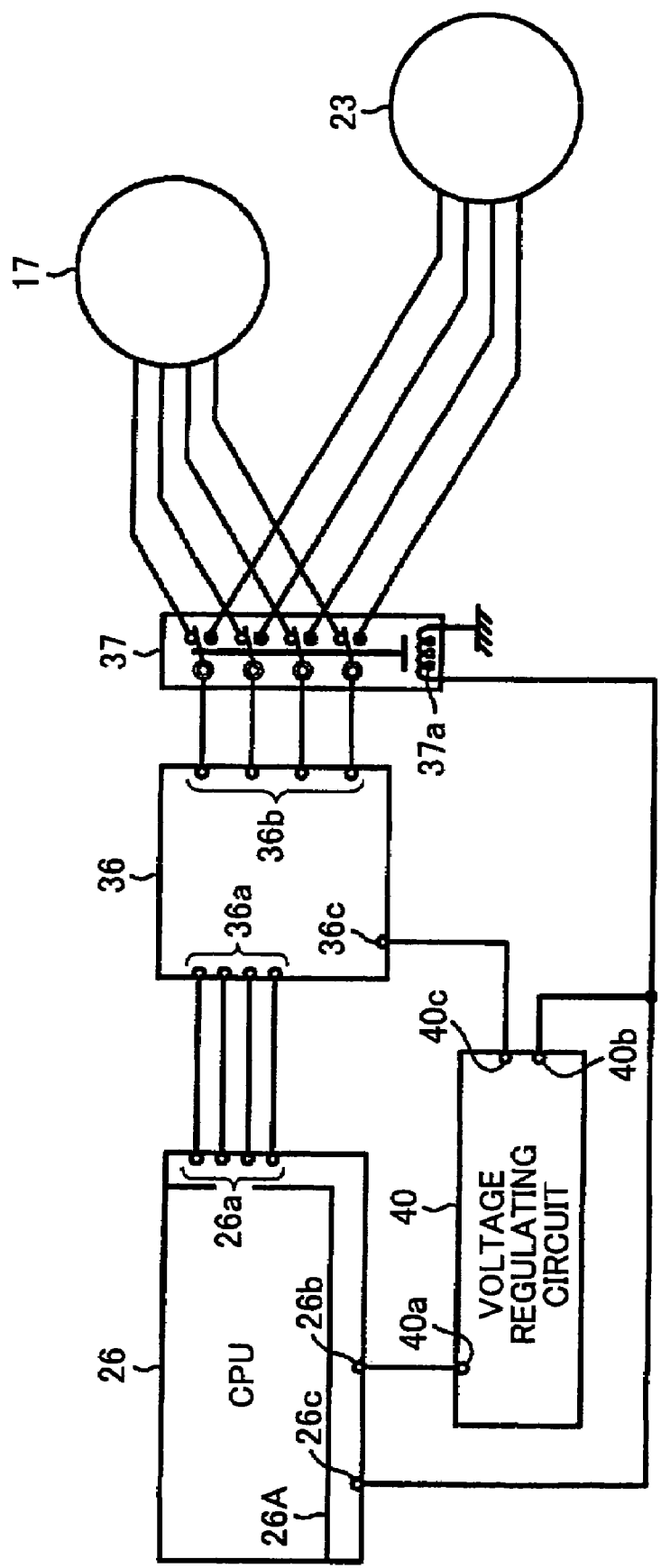
FIG. 8 is an explanatory diagram corresponding to FIG. 3 according to a variation of the preferred embodiment.

(3) FIG. 8 shows an example of a single third driver circuit 36 used to drive both the F motor 17 and X motor 23. Specifically, the driver circuit 36 includes four excitation signal input terminals 36a connected to the excitation phase output ports 26a of the CPU 26, four excitation current output terminals 36b, and an output current switching terminal 36c connected to the output terminal 40c of the voltage regulating circuit 40. The excitation current output terminals 36*b* are connected to four common terminals (indicated by ◎) provided in a relay (magnetic switch) 37. The relay 37 has four b contact points (indicated by ○) connected to an excitation coil in the F motor 17, four a contact points (indicated by ●) connected to an excitation coil in the X motor 23, and a coil 37*a*.

The relay 37 includes four sets of dual-circuit switches that are switched simultaneously. Hence, when the driver switching port 26*c* of the CPU 26 supplies a LOW level relay switching signal to the coil 37*a* of the relay 37, the relay 37 does not switch, and the four common terminals and the corresponding b contact points are short-circuited. As a result, the excitation drive current outputted from the excitation current output terminals 36*b* is supplied to the F motor 17. Here, the relay 37, driver switching port 26*c*, and the like constitute the switching mechanism.

However, when the driver switching port 26*c* supplies a HIGH level relay switching signal to the coil 37*a* of the relay 37, the relay 37 switches, short-circuiting the four common terminals and the four a contact points. As a result, the excitation drive current outputted from the excitation current output terminals 36*b* is supplied to the X motor 23.

Therefore, when executing normal stitches, the CPU 26 outputs a LOW level relay switching signal from the driver switching port 26*c* when the power switch is turned on. Accordingly, a LOW level signal is supplied to the second input terminal 40*b* of the voltage regulating circuit 40 and causes the relay 37 to switch.

Since the voltage regulating circuit 40 has the equivalent circuit shown in FIG. 5A at this time, based on FIG. 6, the output current switching port 26*b* of the CPU 26 supplies a high impedance signal to the first input terminal 40*a*, and the output terminal 40*c* outputs a voltage of 2.91 V to the output current switching terminal 36*c* of the driver circuit 36 for initializing the F motor 17. Hence, the driver circuit 36 supplies an excitation drive current of 0.65 A to the F motor 17 via the relay 37.

When initialization is completed, the CPU 26 outputs a LOW level signal to the voltage regulating circuit 40 from the output current switching port 26*b*. Hence, the voltage regulating circuit 40 outputs a voltage of 1.72 V to the driver circuit 36, and the driver circuit 36 supplies an excitation drive current of 0.40 A to the F motor 17 via the relay 37.

However, since the CPU 26 outputs a HIGH level signal to the voltage regulating circuit 40 from the output current switching port 26*b* for driving the F motor 17, the voltage regulating circuit 40 outputs a voltage of 3.42 V to the driver circuit 36. Accordingly, the driver circuit 36 can supply an excitation drive current of 0.80 A. At this time, upon receiving an excitation phase signal from the CPU 26, the driver circuit 36 supplies an excitation drive current of 0.80 A in pulses to the F motor 17 via the relay 37 based on the excitation phase signal.

When sewing an embroidery pattern, the driver switching port 26*c* of the CPU 26 outputs a HIGH level driver switching signal when the power switch of the sewing machine M is turned on. Therefore, a HIGH level signal is supplied to the second input terminal 40*b* of the voltage regulating circuit 40, and the relay 37 is switched by the HIGH level driver switching signal.

Since the voltage regulating circuit 40 has the equivalent circuit shown in FIG. 5B at this time, based on FIG. 7, the output current switching port 26*b* of the CPU 26 supplies a high impedance signal to the first input terminal 40*a*, and the output terminal 40*c* outputs a voltage of 2.40 V to the output current switching terminal 36*c* of the driver circuit 36 for initializing the X motor 23. Hence, the driver circuit 36 supplies an excitation drive current of 0.56 A to the X motor 23 via the relay 37.

When initialization is completed, the CPU 26 outputs a LOW level signal to the voltage regulating circuit 40 from the output current switching port 26*b*. Hence, the voltage regulating circuit 40 outputs a voltage of 0.88 V to the driver circuit 36, and the driver circuit 36 supplies an excitation drive current of 0.21 A to the X motor 23 via the relay 37.

However, since the CPU 26 outputs a HIGH level signal to the voltage regulating circuit 40 from the output current switching port 26*b* for driving the X motor 23, the voltage regulating circuit 40 outputs a voltage of 3.10 V to the driver circuit 36. Accordingly, the driver circuit 36 can supply an excitation drive current of 0.70 A. At this time, upon receiving an excitation phase signal from the CPU 26, the driver circuit 36 supplies an excitation drive current of 0.70 A to the X motor 23 via the relay 37 based on the excitation phase signal.

In this example, a single driver circuit 36 is connected to the F motor 17 and X motor 23, and the relay 37 is provided to selectively supply the drive current outputted from the driver circuit 36 to either the F motor 17 or the X motor 23. Hence, by providing a simple relay 37, it is possible to decrease the number of costly driver circuits and to reduce the cost required for manufacturing the forward/rearward feed dog moving mechanism and the embroidery frame moving mechanism 20.

Figure 9:
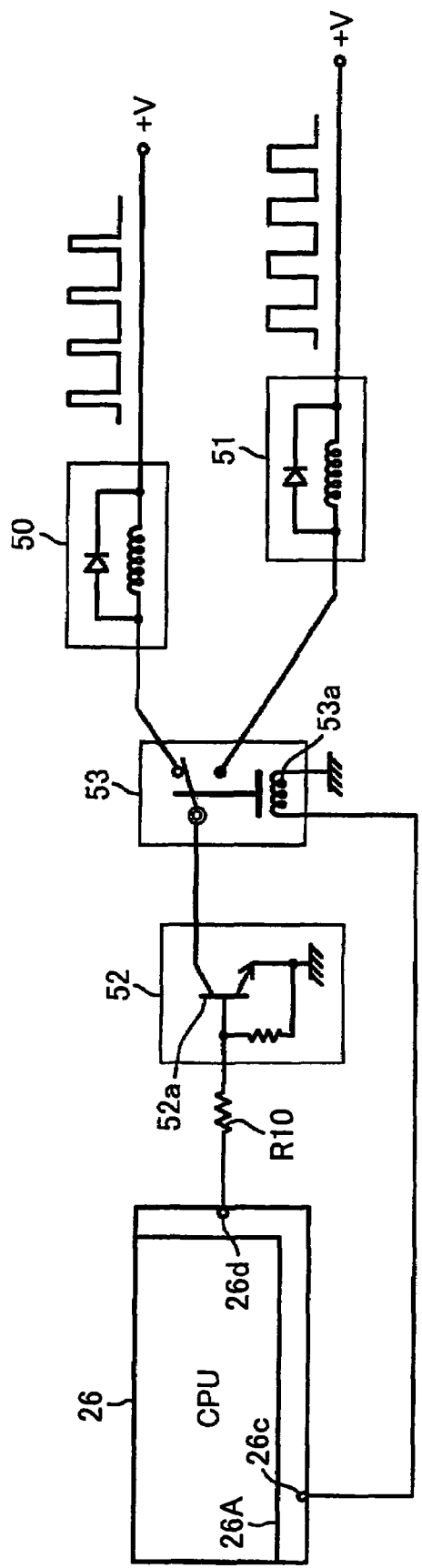
FIG. 9 is an explanatory diagram showing the relationship of a CPU, driver circuit, and solenoids according to a variation of the preferred embodiment.

(4) The sewing machine M may also be provided with a thread cutting mechanism for cutting a sewing thread and bobbin thread with a fixed blade and a movable blade, and a solenoid for driving the movable blade. Further, the sewing machine M may be provided with a thread adjusting mechanism for adjusting the sewing thread by pinching the thread between a pair of thread adjustment plates including a fixed plate and a movable plate, and a solenoid for pressing the movable plate against the fixed plate. FIG. 9 shows a construction for driving both the thread adjustment solenoid and movable blade driving solenoid with a single driver circuit.

Specifically, a driver circuit 52 and a relay 53 are connected in series to a pulse control port 26*d* provided in the I/O port group 26A of the CPU 26. The driver circuit 52 is configured of a NPN transistor 52*a*. The relay 53 includes one set of dual-circuit switches, and a coil 53*a*. Hence, the pulse control port 26*d* is connected to a base of the NPN transistor 52*a* via a resistor R10, while the collector of the NPN transistor 52*a* is connected to a common terminal (indicated by ◎) of the relay 53. A b contact point (indicated by ○) of the relay 53 is connected to a terminal of a thread adjustment solenoid 50. A DC voltage (+V) is applied to the other end of the thread adjustment solenoid 50.

An a contact point (indicated by ●) of the relay 53 is connected to a terminal of a movable blade solenoid 51. A DC voltage (+V) is applied to the other end of the movable blade solenoid 51. When the thread adjustment mechanism adjusts the thread during a sewing operation, the driver switching port 26*c* of the CPU 26 supplies a LOW level solenoid switching signal to the coil 53*a* of the relay 53. In this case, the relay 53 is not switched. Hence, the common terminal is connected to the b contact point, and the thread adjustment solenoid 50 is activated.

However, when the sewing process is completed and the thread cutting mechanism performs a cutting operation, the driver switching port 26*c* of the CPU 26 supplies a HIGH level solenoid switching signal to the coil 53*a*. In this case, the relay 53 is switched so that the common terminal is connected to the a contact point. As a result, the movable blade solenoid 51 is activated in this example, the relay 53, driver switching port 26c, and the like constitute the operation switching mechanism.

The CPU 26 has various registers for setting a timer output, a counter, a clear counter cause, a period, and a duty value. When a start count command is received, the pulse control port 26d outputs a control pulse having the duty ratio set in the duty value register.

Figure 10A:
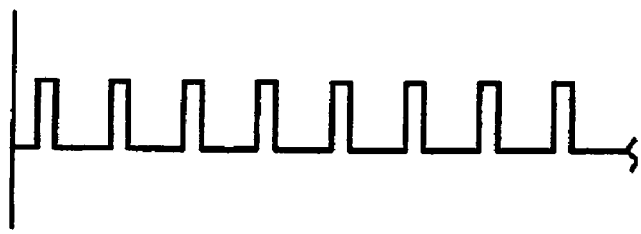
FIG. 10A is an explanatory diagram illustrating a control pulse with a duty ratio of 25%.

For example, when a LOW level solenoid switching signal is outputted at the beginning of a sewing operation, the duty ratio is set to 25%, as shown in FIG. 11. Consequently, a pulse width modulated (PWM) control pulse with a duty ratio of 25% is outputted, as shown in FIG. 10A.

Figure 10B:
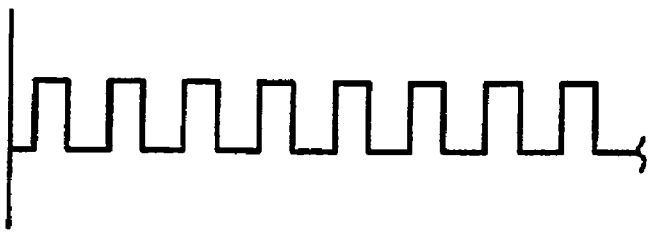
FIG. 10B is an explanatory diagram illustrating a control pulse with a duty ratio of 50%.

As shown in FIG. 11, when a HIGH level solenoid switching signal is outputted for cutting thread after a sewing process, the duty ratio is set to 50%. Consequently, a PWM control pulse having a duty ratio of 50% is outputted as shown in FIG. 10B.

As described above, the duty ratio is set to 25% in the CPU 26 when adjusting the thread during a sewing operation. Accordingly, the pulse control port 26d outputs a control pulse having a duty ratio of 25% to the NPN transistor 52a of the driver circuit 52. At the same time, the driver switching port 26c supplies a LOW level solenoid switching signal to the coil 53a so that the relay 53 does not switch.

At this time, the NPN transistor 52a conducts electricity when the control pulse applied to the base is High level, and the thread adjustment solenoid 50 operates by a direct current supplied from a DC power supply. As shown in FIG. 9, the thread adjustment solenoid 50 operates by a drive pulse having a prescribed period of 25%, identical to the control pulse having the duty ratio of 25%. Therefore, when the thread adjustment solenoid 50 is activated, the duty ratio is adjusted to 25% in response.

However, when the sewing process is completed and the thread cutting mechanism performs a thread cutting operation, the duty ratio in the CPU 26 is set to 50%, as described above. Hence, the pulse control port 26d outputs a control pulse with a duty ratio of 50% to the NPN transistor 52a. At the same time, the driver switching port 26c supplies a HIGH level solenoid switching signal to the coil 53a so that the relay 53 is switched.

At this time, the NPN transistor 52a conducts electricity when the control pulse applied to the base is at HIGH level, at which time the movable blade solenoid 51 is activated. In this case, as shown in. FIG. 9, the movable blade solenoid 51 operates at a prescribed period of 50%, just like the control pulse having the duty ratio of 50%. Therefore, when the movable blade solenoid 5.1 is activated, the duty ratio is adjusted to 50% in response.

With this construction, the thread adjustment solenoid 50 and movable blade solenoid 51 are connected to the pulse control port 26d, serving as a common input/output port of the CPU 26 via the common driver circuit 52, and the relay 53 is used to selectively switch whether the thread adjustment solenoid 50 or movable blade solenoid 51 is activated. In response to the relay 53 switching activation of the thread adjustment solenoid 50 and movable blade solenoid 51, the duty ratio of the control pulse supplied to the driver circuit 52 is adjusted so that the driver circuit 52 outputs a suitable drive current to the thread adjustment solenoid 50 or movable blade solenoid 51. Accordingly, both the thread adjustment solenoid 50 and movable blade solenoid 51 can be driven by suitable drive currents, even when the drive pulse for the thread adjustment solenoid 50 and movable blade solenoid 51 differ due to differing magnitudes of torque required to drive the thread adjusting mechanism and the thread cutting mechanism and even when the thread adjustment solenoid 50 and movable blade solenoid 51 are connected to a common pulse control port 26d of the CPU 26 via a common driver circuit 52. In addition, this construction can minimize the number of input/output ports required in the CPU 26 and the number of driver circuits 52, thereby minimizing the cost required for constructing the CPU 26, the thread adjusting mechanism, and the thread cutting mechanism.

(5) As described above; the pulse control port 26d is configured to output control pulses having different duty ratios by modifying the settings for registers in the CPU 26. However, it is possible to provide a control pulse signal generating circuit between the CPU 26 and the driver circuit 52 that can output various control pulses (PWM signals) having different duty ratios.

(6) When the first and second electric actuators are DC motors having different maximum revolutions, two first and second driver circuits may be used for selectively driving the DC motors or a single common driver circuit may be used for selectively driving the two motors.

(7) When using a stepping motor having different drive currents, it is possible to provide a plurality of driver circuits corresponding to the number of excitation phases in the stepping motor. These driver circuits may also be used for driving different stepping motors.

Although the invention has been described with respect to specific illustrative examples, it will be appreciated by one skilled in the art that a variety of changes may be made without departing from the scope of the invention.

What is claimed is:

1. A sewing machine comprising:
   a first driving mechanism that moves a workpiece during a first sewing operation;
   a second driving mechanism that moves a workpiece during a second sewing operation, either the first driving mechanism or the second driving mechanism being selectively driven;
   a first electric actuator that drives the first driving mechanism with a first drive current;
   a second electric actuator that drives the second driving mechanism with a second drive current different from the first drive current;
   a CPU that controls the first and second electric actuators, the CPU having input/output ports including common input/output ports;
   a first driver circuit connected between the common input/output ports of the CPU and the first electric actuator;
   a second driver circuit connected between the common input/output ports of the CPU and the second electric actuator;
   a switching unit that includes an inverter and that performs a switching action to selectively activate either one of the first and second electric actuators; and
   a voltage regulating circuit that is connected between one of the input/output ports of the CPU and the first driver circuit and that is connected between the one of the input/output ports of the CPU and the second driver circuit, for applying a voltage corresponding to the first drive current to the first driver circuit and for applying a voltage corresponding to the second drive current to the second driver circuit, in synchronization with the switching action of the operation switching unit, such that one of the driver circuits is selectively activated.

2. The sewing machine according to claim 1, wherein the CPU implements the switching action performed by the switching unit.

3. The sewing machine according to claim 2, wherein the input/output ports include a driver switching port that outputs a driver switching signal to selectively switch activation of the first driver circuit and the second driver circuit.

4. The sewing machine according to claim 1, wherein:
the first driving mechanism is a forward/rearward feed dog moving mechanism for moving a feed dog forward and rearward;
the second driving mechanism is an X-direction drive unit of an embroidery frame moving mechanism;
the first electric actuator is a stepping motor for driving the feed dog forward and rearward; and
the second electric actuator is a stepping motor for driving the embroidery frame in the X-direction.

5. The sewing machine according to claim 1, wherein:
the first driving mechanism is a Y-direction drive unit of an embroidery frame moving mechanism;
the second driving mechanism is a horizontal feed dog moving mechanism for moving a feed dog left and right;
the first electric actuator is a stepping motor for Y-direction movement; and
the second electric actuator is a stepping motor for horizontal feed dog movement.

6. The sewing machine according to claim 1, wherein:
the first driving mechanism is a thread cutting mechanism for cutting thread between a fixed blade and a movable blade;
the second driving mechanism is a thread adjusting mechanism;
the first electric actuator is a stepping motor for driving the movable blade; and
the second electric actuator is a stepping motor for thread adjustment.

7. The sewing machine according to claim 1, wherein the switching unit selectively switches operations of the first and second driver circuits in response to a switching signal outputted from the CPU.

8. The sewing machine according to claim 1, wherein a single driver circuit is commonly used as the first and second driver circuits.

9. The sewing machine according to claim 8, wherein the switching unit selectively supplies a drive current outputted from the single driver circuit to the first and second electric actuators.

10. The sewing machine according to claim 8, wherein the CPU implements the switching action performed by the switching unit.

11. The sewing machine according to claim 10, wherein the input/output ports include a driver switching port that outputs a driver switching signal to selectively switch activation of the first driver circuit and the second driver circuit.

12. The sewing machine according to claim 8, wherein:
the first driving mechanism is a forward/rearward feed dog moving mechanism for moving a feed dog forward and rearward;
the second driving mechanism is an X-direction drive unit of an embroidery frame moving mechanism;
the first electric actuator is a stepping motor for driving the feed dog forward and rearward; and
the second electric actuator is a stepping motor for driving the embroidery frame in the X-direction.

13. The sewing machine according to claim 1, wherein:
the first driving mechanism is a Y-direction drive unit of an embroidery frame moving mechanism;
the second driving mechanism is a horizontal feed dog moving mechanism for moving a feed dog left and right;
the first electric actuator is a stepping motor for Y-direction movement; and
the second electric actuator is a stepping motor for horizontal feed dog movement.

14. The sewing machine according to claim 8, wherein:
the first driving mechanism is a thread cutting mechanism for cutting thread between a fixed blade and a movable blade;
the second driving mechanism is a thread adjusting mechanism;
the first electric actuator is a stepping motor for driving the movable blade; and
the second electric actuator is a stepping motor for thread adjustment.

15. The sewing machine according to claim 8, wherein the switching unit comprises a relay, the relay having a first set of common terminals connected to the single driver circuit, a second set of output contacts connected to the first electric actuator, a third set of output contacts connected to the second electric actuator, a fourth set of dual-circuit switches that are switched simultaneously, and a coil connected to the CPU, wherein the fourth set of dual-circuit switches is switched in response to a switching signal fed from the CPU to the coil.

16. A sewing machine comprising:
a first driving mechanism that moves a workpiece during a first sewing operation;
a second driving mechanism that moves a workpiece during a second sewing operation, either the first driving mechanism or the second driving mechanism being selectively driven;
a first electric actuator that drives the first driving mechanism with a first drive current;
a second electric actuator that drives the second driving mechanism with a second drive current different from the first drive current;
a CPU that controls the first and second electric actuators, the CPU having input/output ports including common input/output ports;
a common driver circuit connected between the common input/output ports of the CPU and the first and second electric actuators;
a switching unit that includes a relay and that performs a switching action to selectively activate either one of the first and second electric actuators; and
a control pulse signal generator that adjusts a duty ratio of a control signal supplied to the common driver circuit so that the common driver circuit outputs a drive current for the respective first and second electric actuators in response to the switching unit, such that one of the first and second electric actuators is selectively activated.

17. The sewing machine according to claim 16, wherein:
the first driving mechanism is a thread cutting mechanism for cutting thread between a fixed blade and a movable blade;
the second driving mechanism is a thread adjusting mechanism;
the first electric actuator is a solenoid for driving the movable blade; and
the second electric actuator is a solenoid for thread adjustment.

* * * * *